Figure 1:
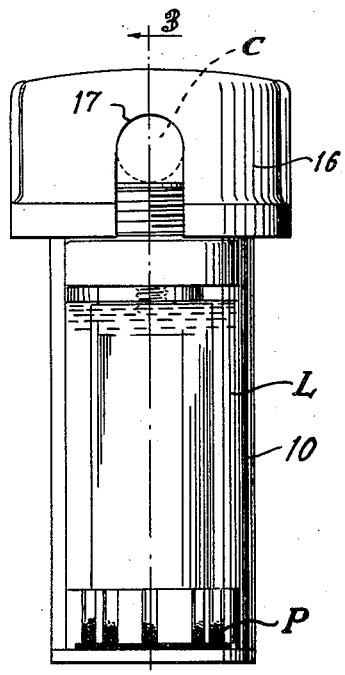

July 31, 1951 — J. ORAM — 2,562,434
CURRENT SURGE INDICATOR
Filed Aug. 25, 1949

INVENTOR.
John Oram
BY Ashley & Ashley

Patented July 31, 1951

2,562,434

UNITED STATES PATENT OFFICE 2,562,434

CURRENT SURGE INDICATOR

John Oram, Dallas, Tex.

Application August 25, 1949, Serial No. 112,327

11 Claims. (Cl. 177—311)

This invention relates to new and useful improvements in electric current surge indicators.

It often happens in the electrical power industry that electrical transmission lines are subjected to exceptionally heavy surges of current, during electrical storms and under other circumstances, and such surges result in interruption of electrical service, either through the tripping of circuit breakers or other protective devices, or because of physical or electrical damage to said transmission lines. This situation obtains both in high voltage transmission lines and in electrical power lines within a city and leading throughout the suburbs and environs thereof.

When such interruption of electrical service occurs, it is very important that the electric company service or repair crews be able to locate the fault or damaged portion of the transmission line as quickly as possible so that it may be repaired and electrical service restored. Because of the complexity and magnitude of modern electric power supply systems considerable time is often required to locate the exact source of the trouble, and for this reason, various types of devices have been developed which may be attached to or associated with electric power supply lines to give an indication of the passage of a heavy surge of electrical current through said line. Normally, such devices are employed at each branching of the power supply network so that a repair crew may quickly check the various portions of the power system or network to ascertain the location of the fault therein.

Previous devices of this type have assumed the nature of a relay which is tripped upon the passage of a heavy current surge to record a permanent or lasting record of such passage. Several objections to such devices have developed, however, among them being the necessity for a workman to climb the pole supporting the power lines in order to reset the device, an operation which obviously incurs prohibitive expense if numerous devices of this type are used where trip-outs are frequent. The devices have also been objectionable in that they are mechanical in nature and are adversely affected by weather conditions, sometimes being rendered inoperative by heavy ice and gradually deteriorating over the years as they are exposed to the weather.

It is therefore an important object of this invention to provide an improved electric current surge indicator which is extremely simple and economical to manufacture and use, and which gives dependable and trustworthy service over a period of years.

A principal object of the invention is to provide an improved electric current surge indicator which functions upon the passage of a heavy current to provide an indication of such passage which will remain observable for a period of several hours, and which will automatically return itself to a non-indicating position after such passage of time whereby the device is capable of indicating the passage of future surges of current, and whereby it is not necessary for a workman to reset the device manually.

A particular object of the invention is to provide an improved electric current surge indicator which will function an indefinite number of times without any attention or manual manipulation whatsoever, which may be placed around a metallic conductor of electric energy and will indicate periodic surges of electric current without it being required that anyone operate, adjust, or manipulate the device in any fashion in order for it to indicate or restore its condition for indicating the passage of current surges.

A still further object of the invention is to provide an improved electric current surge indicator which is completely enclosed and sealed against the weather and cannot be adversely affected by freezing or icing conditions or other circumstances resulting from the exposure of the device over long periods of time to the open weather.

A particular object of the invention is to provide an improved electric current surge indicator having therein a body of clear liquid and a quantity of opaque, inert material, the liquid normally being clear but becoming visibly opaque upon the passage of a heavy surge of electric current through the power line with which the device is associated.

A still further object of the invention is to provide an improved electric current surge indicator having a metallic armature adapted to be affected by the magnetic field created by a current of electricity passing through the power line with which the device is associated, and additional quantities of metal carried by the armature adapted to be affected increasingly by the lines of magnetic force as the armature moves toward said conductor whereby the length of travel of the moving element and positiveness of operation of the device is increased without otherwise adversely affecting the function of said armature.

A pertinent object of the invention is to provide an improved electric current surge indicator having a sealed container carrying a body of liquid and adapted to be positioned adjacent an electrical conductor, there being an armature and plunger within the container adapted to be moved toward said conductor upon the passage of a heavy electrical current therethrough, the armature and plunger carrying a buoyancy chamber which reduces the force necessary to so shift or move the armature toward the conductor.

A construction designed to carry out the invention will be hereinafter described together with other features of the invention.

Figure 2:
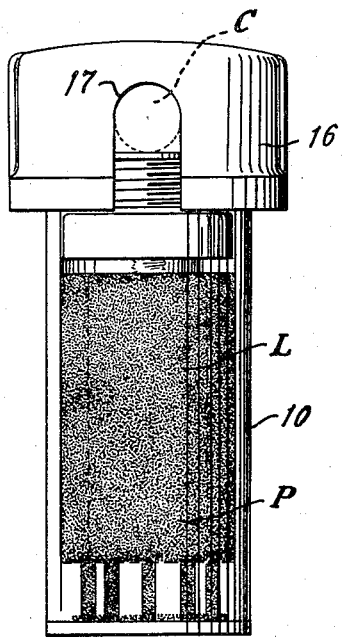
Figure 3:
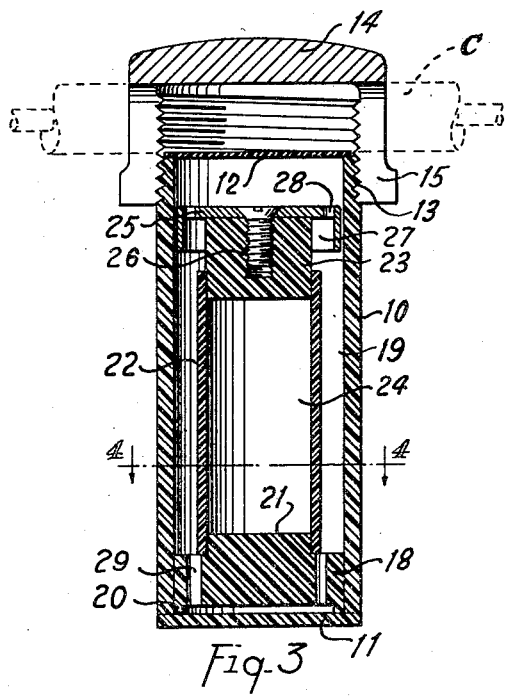
Figure 4:
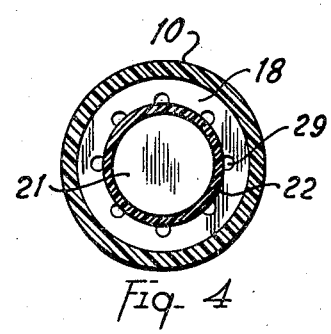

The invention will be more readily understood from a reading of the following specification and by reference to the accompanying drawing, wherein an example of the invention is shown, and wherein:

Fig. 1 is a view in elevation of an electric current surge indicator constructed in accordance with this invention and showing the device in a non-indicating condition, Fig. 2 is a view similar to Fig. 1 illustrating the device after the passage of a surge of electrical current and showing the device in an indicating condition, Fig. 3 is a vertical, cross-sectional view taken upon the line 3—3 of Fig. 1, and Fig. 4 is a horizontal, cross-sectional view taken upon the line 4—4 of Fig. 3.

In the drawings, the numeral 10 designates an elongate, hollow, cylindrical housing or container, having its lower end 11 closed, and its upper end sealed by a transverse disc or plate 12. The upper end of the housing 10 carries external screw threads 13 which are received within a screw-threaded cap 14. The cap is provided with diametrically opposed notches 15 cut in its skirt 16, the notches extending upwardly within said skirt to a point substantially in horizontal alignment with the underside of the top of the cap as illustrated in Fig. 3, and having their upper end 17 rounded as shown in Figs. 1 and 2. The notches or recesses 15 are adapted to receive an electrical conductor C as shown in Fig. 3, the conductor being held in engagement with the upper ends 17 of said notches by the screwing of the housing 10 into the cap so that the upper plate 12 of said housing urges the conductor against the underside of the top of the cap 14, whereby the conductor is both held within the cap, and the cap and housing are suspended from said conductor.

A substantially cylindrical plunger 18 has a free sliding fit in the bore 19 of the housing 10, the plunger being provided with a marginal, depending lip 20 which normally engages the bottom 11 of the housing as the plunger rests thereon. An upstanding boss or pin 21 of reduced diameter is provided centrally of the upper side of the plunger 18 and telescopes the lower end of an elongate hollow tube 22 disposed within the housing and projecting upwardly therefrom the plunger to a point adjacent the upper end of said housing. A cylindrical plug 23 fits in the upper end of the tube 22 whereby both ends of the latter are closed and a hollow buoyancy chamber 24 within the interior of the tube 22, is defined.

The plug 23 projects upwardly from the upper end of the tube 22 and has a circular metallic plate or armature 25 secured to its upper end by means of a screw 26 or other suitable or desirable means. The plate or armature 25 has a diameter less than the diameter of the bore 19 whereby peripheral clearance is provided around the edges of said plate, and carries a depending marginal skirt 27, formed integrally with said plate. A plurality of transverse openings 28 are arranged in an annulus about the outer portion of the plate 25, the openings being disposed between the outer surface of the plug 23 and the inner surface of the skirt 27. A similar group of openings 29 are arranged in an annulus about the outer portion of the plunger 18, the lower ends of the latter openings being within the marginal flange 20 of said plunger, and the upper ends of the openings being disposed outwardly of the circumference of the tube 22.

The housing 10, for the purposes of this invention, must be transparent to a sufficient extent to permit the observation of the contents thereof. While it is preferable that the housing be absolutely clear and colorless, it is obvious that it may be colored lightly and may lack complete transparency so long as vision into the interior thereof is possible. Thus, the housing may be formed of glass, plastic, or any other suitable material, the acrylic resins having been found particularly suitable by reason of their ready workability and machineability, and because of their resistance to weathering. Similarly, the housing 10 may be formed of a suitable type of glass.

The plunger 18, tube 22, and plug 23, are also preferably formed of plastic because of its lightness, and preferably a clear plastic because of its ability to transmit light. Nevertheless, it is not desired to exclude other materials since, as will appear more fully hereinafter, the use of a clear plastic for the formation of these elements is not essential. The top plate 12 should be formed of a non-magnetic material and a materal which may be bonded to the upper end of the housing 10 to seal the interior of the same. For this reason, a synthetic resin is preferable but is not essential.

The interior of the housing 10 is filled with a suitable indicating liquid L which may be any clear or transparent fluid which will not freeze or solidify in cold weather and which is chemically inert with respect to the elements of the device which which it comes in contact. A particularly desirable liquid for this purpose is composed of approximately 60% water and approximately 40% ethylene glycol. Any suitable or desirable anti-freeze may be used, however, and there are many organic liquids which may be used alone without being combined with any other liquid or substance. Since so many types of liquid are usable for this purpose, and since it is well within the ability of any skilled chemist or technician to provide a number of liquids suitable for the purpose, the liquid will be defined with reference to its properties rather than with reference to its particular composition. The invention does not hinge upon any particular composition, nor indeed, upon the properties of the liquid given hereinafter. For year round and dependable operation, however, the material should have the recited physical and chemical properties.

The liquid should be relatively thin, since the plunger 18 is to reciprocate therein, and the viscosity of the liquid should remain reasonably constant over the range of temperatures encountered in operation. The liquid is preferably absolutely clear and preferably colorless, although color may be tolerated in the liquid so long as it does not approach opacity. The liquid should also be resistant to freezing or solidifying in cold weather, and should not vaporize or volatilize in hot weather to any appreciable degree.

Incorporated in the liquid is a quantity of opaque powder or material P in a finely divided state. The powder must be insoluble in the liquid employed, and is preferably highly colored. I have found commercial rouge suitable for this purpose and have employed about five to ten grams of the latter material for each gallon of the liquid component. Chemical inertness, insolubility, and high visibility are the properties desired for the powdered materials.

The operation of the device is well illustrated by Figs. 1 and 2 of the drawings. Normally, with average or normal electrical currents passing through the electrical conductor C, the device will be in a non-indicating condition and will merely be hanging from said conductor with all of the powder P settled to the bottom of the container 10. As illustrated, a portion of the powder will settle on top of the plunger 18, a portion therebelow, and a portion within the openings 29. Now, as soon as a heavy surge of electrical current passes through the conductor C, the increased intensity of the magnetic field surrounding said conductor will draw the armature 25 upwardly against the top plate 12. As the armature approaches the plate, the skirt 27 carried by the armature will be moved into a magnetic field of increasing intensity, and the resultant magnetic force urging the armature and plunger structure upwardly will be increased in an obvious fashion. Thus, once the upward movement of the armature commences, an increasing force will be provided for continuing such upward movement to the full extent of the armature stroke. Of course, virtually all power lines are protected by circuit breakers or similar devices, and the heavy surge of current, having caused such protective devices to function, the circuit will be opened and all electrical current through the conductor C will cease. Thereupon, the armature and plunger, of their own weight, fall again to the bottom of the housing 10, so that the complete cycle of operation encompasses the upward movement of the armature and plunger within the housing and the return of said elements therein to their lower position as shown in the drawings. The level of the liquid L within the container is normally slightly above the armature 25, and the openings 28 thereby function as liquid and air passages to permit the liquid and air within the container above the liquid level to surge back and forth from one side to the other of the armature as this reciprocation cycle takes place. The plunger 18 and the openings 19, however, are turbulence-providing devices and create high velocity jets within the body of liquid as the plunger is reciprocated. The resulting turbulence will stir up or agitate the powder P which has settled to the bottom of the body of liquid and will cause the powder to be dispersed throughout said body of liquid into a state of suspension. Because of the high color and opacity of the powder the liquid thus changes from a clear, colorless body to an opaque, highly-colored body. A workman or lineman, observing the device from the ground, may readily distinguish between the two conditions, even at night by the aid of a flashlight, and will thus receive clear and adequate indication as to the passage of a surge of current. If the housing appears to be clear, there has been no current surge. On the other hand, if the housing appears opaque and colored, there has been a heavy surge of current.

While not essential to the principle of this invention, there are several details of structure which increase the efficiency and desirability of the device. For instance, it is preferable that the screw-threaded cap 14 be formed of ferrous metal which provides a path for the magnetic field surrounding the conductor C when it is conducting electricity. The lower edge of the skirt 16 of said cap is disposed in close proximity to the armature 25, and the lines of force of the magnetic field are thus concentrated in the neighborhood of said armature. With this arrangement, the armature is made responsive to the magnetic field after it has increased to a certain point and said field is concentrated in the neighborhood of the armature. Further, the positioning of the armature in its "at rest" position may be varied with respect to the lower portion of the skirt 16 of the cap 14 to regulate or adjust the calibration of the device. Thus, the device may be constructed to operate upon the passage of 250 amperes or less through the conductor C, or it may be arranged with a greater air gap so as not to respond until the electric current reaches the level of 500 amperes or higher. The travel of the armature is increased by the provision of the skirt 27 which, as previously explained, provides an additional continuous lifting force for the armature and plunger once the armature has commenced its movement toward the conductor C.

The buoyancy chamber 24 is of considerable importance in determining the sensitivity of the device. The armature and plunger structure possesses an appreciable weight and requires a certain minimum of force or power for lifting the same toward the upper end of the housing 10. The provision of the buoyancy chamber 24 has the effect of counteracting and balancing this weight since the chamber causes the armature and plunger structure to tend to float within the body of liquid L. For this reason, less force is required to raise the structure within the housing and the same will respond to a magnetic field of less intensity so that the device is made responsive to the flow of a smaller current. Of course, the size of the buoyancy chamber may be varied, the weight of the armature and the weight of the entire armature and plunger structure may be increased or decreased to cause the device to function upon the passage of a certain minimum current. This is a matter of design and a changing of dimensions and is not viewed as material to this disclosure.

Because the only moving part of the device is the armature plunger structure, and because the latter is completely enclosed within the sealed housing 10, it is obvious that weather conditions will not affect either the operation or the life of this device. Once positioned upon a power line, no operating or maintenance costs are incurred except to observe the indication of the passage of a heavy surge of current. The powder P is heavier than the liquid L and will gradually settle to the bottom of the body of liquid. As previously described, the reciprocation of the armature and plunger structure in response to a surge of electric current will agitate the powder and liquid and cause the powder to be dispersed throughout the body of liquid to give visual indication of such current surge. After an hour or more, however, the powder will have gradually settled to the bottom of the body of liquid, leaving the latter transparent and colorless and restoring the device to a condition for indicating the passage of future current surges. Here again, by selection of the density and particle size of the powder P, and the density and viscosity of the liquid L, the settling time may be varied at will to further change or regulate the operation of the device. It is obvious, that the use of a heavy powder in a relatively thin and light liquid will result in the settling of the powder within a few moments so that the device again resumes an indicating condition within the space of a few moments. Decreasing density of the powder or increasing density or viscosity of the liquid will increase the settling time, and the latter may be increased as desired up to a period of a considerable number of hours. In most instances, it is desirable for the powder to settle within one or two hours since the indication of a current surge must be maintained until the repair crew has time to inspect the device following the interruption of electrical service, but the time should not be increased too greatly because it may interfere with the indication of subsequent current surges through the same power line.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An electric current surge indicator including, a container adapted to be mounted in close proximity to an electrical conductor, a fluid within the container, a finely-divided solid in the fluid, and a magnetic element within the container adapted to undergo movement and create turbulence in the fluid upon the increase in magnetic flux caused by the passage of a heavy current of electricity through the conductor, the turbulence in the fluid dispersing the finely-divided solid therein to give a visual indication of the current surge.

2. An electric current surge indicator including, a container adapted to be connected to an electrical conductor, a fluid within the container, a finely-divided solid in said fluid, and an armature plunger within the container, the plunger being responsive to a surge of current in the conductor to agitate the fluid and disperse therein the finely-divided solid to give a visual indication of the current surge.

3. An electric current surge indicator including, a container adapted to be mounted in juxtaposition with an electrical conductor, a transparent liquid within the container, a finely-divided opaque solid in said liquid; and an armature plunger within the container, the plunger being responsive to a surge of current in the conductor to agitate the liquid and disperse therein the opaque solid to give a visual indication of the current surge.

4. An electric current surge indicator as set forth in claim 3, wherein the liquid is colorless and the solid is colored.

5. An electric current surge indicator including, a container adapted to be connected to an electrical conductor, an armature plunger within the container, and a liquid within the container, said liquid being clear when at rest and turbid when agitated; the plunger being responsive to a surge of current in the conductor to agitate the liquid causing the latter to become turbid and give a visual indication of the current surge.

6. An electric current surge indicator including, a container adapted to be mounted in juxtaposition with an electrical conductor, a fluid in the container adapted to change noticeably its appearance upon agitation of said fluid, a plunger in the container immersed in the fluid, and an armature in the container connected to the plunger, the plunger being responsive to a surge of current in the conductor to agitate the fluid causing the latter to change its appearance noticeably and give a visual indication of the current surge.

7. An electric current surge indicator including, a container adapted to be mounted in juxtaposition with an electrical conductor, a fluid in the container adapted to change noticeably its appearance upon agitation of said fluid, a plunger in the container immersed in the fluid, an armature in the container connected to the plunger, and a hollow body in the container at least partially immersed in the fluid and connected to the armature and plunger, the armature being responsive to a surge of current in the conductor to undergo movement within the container causing the plunger to move within the container and agitate the fluid therein causing the latter to change its appearance noticeably and give a visual indication of the current surge.

8. An electric current surge indicator as set forth in claim 6, wherein the plunger and the armature are provided with surge openings.

9. An electric current surge indicator including, a container adapted to be connected to an electrical conductor, an armature plunger within the container, a liquid within the container, said liquid being clear when at rest and turbid when agitated; and a depending marginal flange on the armature plunger, the plunger being responsive to a surge of current in the conductor to agitate the liquid causing the latter to become turbid and give a visual indication of the current surge.

10. An electric current surge indicator including, a hollow container, a metallic cap adapted to straddle an electrical conductor, means for securing the container to the cap, a liquid in the container, a finely-divided solid in the liquid, a plunger in the lower portion of the container, an armature in the upper portion of the container adjacent the cap, and a buoyant connection between the plunger and the armature at least partially immersed in the liquid; the armature being responsive to a surge of current in the conductor to undergo movement within the container causing the plunger to move within the container and agitate the liquid therein, such agitation dispersing the finely-divided solid in the liquid to give a visual indication of the current surge.

11. An electric current surge indicator including, a metallic screw-threaded cap having diametrically-opposed notches adapted to receive an electrical conductor, a sealed transparent container adapted to be screwed into the cap, a flanged plunger in the lower portion of the container, a metallic armature in the upper portion of the container, a sealed hollow tube connecting the plunger and the armature, a liquid within the container, and a finely-divided colored opaque chemically-inert solid in the liquid, said solid having a density greater than that of the liquid; the armature being responsive to a surge of current in the conductor to undergo movement within the container causing the plunger to move within the container and agitate the liquid therein; such agitation dispersing the finely-divided solid in the liquid to give a visual indication of the current surge.

JOHN ORAM.

REFERENCES CITED

The following references are of record in the file of this patent:

UNITED STATES PATENTS

| Number | Name | Date |
|---|---|---|
| 925,064 | Whitney | June 15, 1909 |
| 1,521,144 | Adair, Jr. | Dec. 30, 1924 |
| 2,138,430 | Rudd | Nov. 29, 1938 |